(12) United States Patent
Kim et al.

(10) Patent No.: US 11,125,614 B2
(45) Date of Patent: *Sep. 21, 2021

(54) SENSOR FOR MOTION INFORMATION, ILLUMINATION INFORMATION AND PROXIMITY INFORMATION, AND OPERATING METHOD OF CENTRAL PROCESSING UNIT (CPU) USING THE SENSOR

(71) Applicant: SAMSUNG ELECTRONICS CO., LTD., Suwon-si (KR)

(72) Inventors: Sung Ho Kim, Yongin-si (KR); Junseok Kim, Hwaseong-si (KR); Jun Haeng Lee, Hwaseong-si (KR); Eric Hyunsurk Ryu, Hwaseong-si (KR); Yunjae Suh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

This patent is subject to a terminal disclaimer.

(21) Appl. No.: 16/423,524

(22) Filed: May 28, 2019

(65) Prior Publication Data

US 2019/0277690 A1 Sep. 12, 2019

Related U.S. Application Data

(63) Continuation of application No. 14/827,986, filed on Aug. 17, 2015, now Pat. No. 10,337,914.

(30) Foreign Application Priority Data

Dec. 26, 2014 (KR) .................. 10-2014-0191032

(51) Int. Cl.
*G01J 1/44* (2006.01)
*G01J 1/02* (2006.01)
(Continued)

(52) U.S. Cl.
CPC .............. *G01J 1/44* (2013.01); *G01J 1/0233* (2013.01); *G01J 1/0437* (2013.01);
(Continued)

(58) Field of Classification Search
CPC .......... G01J 1/44; G01J 1/0492; G01J 1/0488; G01J 1/0437; G01J 1/0233; G01J 1/0209;
(Continued)

(56) References Cited

U.S. PATENT DOCUMENTS 4,576,481 A 3/1986 Hansen
6,253,161 B1 * 6/2001 Arias-Estrada ........ H04N 5/374
702/150

(Continued)

FOREIGN PATENT DOCUMENTS

JP 2007-52497 A 3/2007
KR 10-1336781 B1 12/2013
(Continued)

OTHER PUBLICATIONS

Communication dated Aug. 5, 2016 issued by the European Patent Office in counterpart European Patent Application No. 15190588.2.

*Primary Examiner* — Jennifer D Bennett
(74) *Attorney, Agent, or Firm* — Sughrue Mion, PLLC

(57) ABSTRACT

A sensor configured for sensing motion information, illumination information, and proximity information is provided. The sensor includes a light sensing module configured to sense a change in an intensity of light, a filtering module configured to filter light incident to the light sensing module by using a plurality of filters, and a processor configured to process information associated with an intensity of light passing through the filters.

18 Claims, 16 Drawing Sheets

(51) Int. Cl.
  *G01J 1/04* (2006.01)
  *G01J 1/42* (2006.01)
  *G06F 3/01* (2006.01)
  *G06F 3/03* (2006.01)
  *G06F 1/3231* (2019.01)
  *G06F 1/16* (2006.01)

(52) U.S. Cl.
  CPC ........... *G01J 1/0488* (2013.01); *G01J 1/0492* (2013.01); *G01J 1/4204* (2013.01); *G01J 1/4228* (2013.01); *G06F 1/1684* (2013.01); *G06F 1/1686* (2013.01); *G06F 1/3231* (2013.01); *G06F 3/01* (2013.01); *G06F 3/017* (2013.01); *G06F 3/0304* (2013.01); *H04M 2250/12* (2013.01); *Y02D 10/00* (2018.01)

(58) Field of Classification Search
  CPC ...... G01J 1/0204; G01J 1/4204; G01J 1/4288; G01J 1/02; G06F 1/3231; G06F 3/0304; G06F 3/01; G06F 3/017; G06F 1/1686; G06F 1/1684; H04M 2250/12; Y02D 10/00
  See application file for complete search history.

(56) References Cited

U.S. PATENT DOCUMENTS

| | | | |
|---|---|---|---|
| 6,897,429 B1 * | 5/2005 | Turner | H04N 3/155 250/214 R |
| 7,728,269 B2 | 6/2010 | Lichtsteiner et al. | |
| 8,097,851 B2 * | 1/2012 | Chang | G01J 1/44 250/338.4 |
| 8,350,216 B2 | 1/2013 | Yao et al. | |
| 8,560,004 B1 | 10/2013 | Tsvetkov et al. | |
| 8,658,975 B2 | 2/2014 | Lee et al. | |
| 8,983,036 B2 | 3/2015 | Tredwell et al. | |
| 10,337,914 B2 * | 7/2019 | Kim | G06F 1/3231 |
| 2005/0030393 A1 | 2/2005 | Tull | |
| 2006/0092304 A1 | 5/2006 | Hirota | |
| 2006/0108506 A1 | 5/2006 | Yang et al. | |
| 2008/0179497 A1 | 7/2008 | Maniam et al. | |
| 2008/0219672 A1 | 9/2008 | Tam et al. | |
| 2010/0033611 A1 * | 2/2010 | Lee | H04N 5/3696 348/302 |
| 2012/0132809 A1 | 5/2012 | Findlay et al. | |
| 2013/0334398 A1 * | 12/2013 | Earman | G06K 9/00355 250/206.1 |
| 2014/0009648 A1 | 1/2014 | Kim et al. | |
| 2014/0168372 A1 * | 6/2014 | Chang | G01S 17/86 348/46 |
| 2014/0231633 A1 | 8/2014 | Parodi-Keravec et al. | |
| 2014/0312234 A1 | 10/2014 | Tan | |
| 2015/0358567 A1 * | 12/2015 | Sargent | H01L 27/1461 348/164 |

FOREIGN PATENT DOCUMENTS

| | | |
|---|---|---|
| KR | 10-2014-0005421 A | 1/2014 |
| KR | 10-2014-0022224 A | 2/2014 |
| KR | 10-1361844 B1 | 2/2014 |
| KR | 10-1416000 B1 | 7/2014 |
| KR | 10-2014-0095273 A | 8/2014 |
| KR | 10-2014-0107335 A | 9/2014 |
| WO | 2012069851 A1 | 5/2012 |

* cited by examiner

SENSOR FOR MOTION INFORMATION, ILLUMINATION INFORMATION AND PROXIMITY INFORMATION, AND OPERATING METHOD OF CENTRAL PROCESSING UNIT (CPU) USING THE SENSOR

CROSS-REFERENCE TO RELATED APPLICATION

This is a continuation of U.S. patent application Ser. No. 14/827,986 filed Aug. 17, 2015 (allowed), which claims priority from Korean Patent Application No. 10-2014-0191032, filed on Dec. 26, 2014, in the Korean Intellectual Property Office, the disclosure of which is incorporated herein by reference in its entirety.

BACKGROUND

1. Field

Methods and apparatuses consistent with exemplary embodiments relate to a sensor for motion information, illumination information and proximity information, and an operating method of a central processing unit (CPU) using the sensor.

2. Description of the Related Art

With the wide use of various sensors in electronic devices, user interfaces (UIs) may improve interactions between users and computers and enable various functions of the electronic devices.

For example, a motion sensor may be used to control a variety of interfaces with hand motions without a requirement for touching a screen. An illumination sensor may be used to automatically decrease a brightness of a screen in a dark area and to automatically increase the brightness of the screen in a bright area. A proximity sensor may be used to automatically turn off a screen when a user holds a phone to his ear during calls.

To provide all of the foregoing functions, all of the sensors suitable for the functions, for example, the motion sensor, the illumination sensor, and the proximity sensor, are to be provided.

SUMMARY

Exemplary embodiments may address at least the above problems and/or disadvantages and other disadvantages not described above. Further, the exemplary embodiments are not required to overcome the disadvantages described above, and an exemplary embodiment may not overcome any of the problems described above.

According to an aspect of an exemplary embodiment, there is provided a sensor that includes a light sensing module that includes a plurality of sensing elements, each of which is configured to sense a respective change in light based on lighting conditions, a filtering module that includes a plurality of filters, each of which is configured to filter light incident to the light sensing module, and a processor configured to process information associated with an intensity of light that has propagated through at least one of the plurality of filters by using sensing elements that correspond to the at least one filter. An output of the light sensing module may correspond to motion information, and an output of the processor may correspond to at least one of illumination information and proximity information. The sensor may be implemented as a single chip.

The processor may include a first collector configured to collect currents generated by sensing elements which correspond to a first filter in response to a propagation of light through the first filter, and a second collector configured to collect currents generated by sensing elements which correspond to a second filter in response to a propagation of light through the second filter.

The sensing module may be configured to output an event signal that corresponds to a target sensing element, and the target sensing element may be a sensing element which is configured to sense a change in an intensity of incident light, from among the plurality of sensing elements.

The sensor may further include at least one of a bias voltage controller configured to control at least one of a bias voltage of the sensing module and a bias voltage of the processor, and a low-power mode controller configured to control a low-power mode of the processor.

According to another aspect of an exemplary embodiment, there is also provided a sensor including a filter layer including a plurality of filters disposed in a predetermined pattern, a photo array configured to sense a change in light that has propagated through the filter layer, and a measurement circuit electrically connected to cells in the photo array based on the predetermined pattern.

According to still another aspect of an exemplary embodiment, there is also provided an operating method which is executable by a central processing unit (CPU), the method including generating motion information based on event signals generated by target sensing elements which are configured to sense a change in light, from among a plurality of sensing elements, generating illumination information based on first sensor signals generated by first sensing elements which are configured to sense light that has propagated through a color filter, from among the plurality of sensing elements, and generating proximity information based on second sensor signals generated by second sensing elements which are configured to sense light that has propagated through an infrared (IR) filter, from among the plurality of sensing elements.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
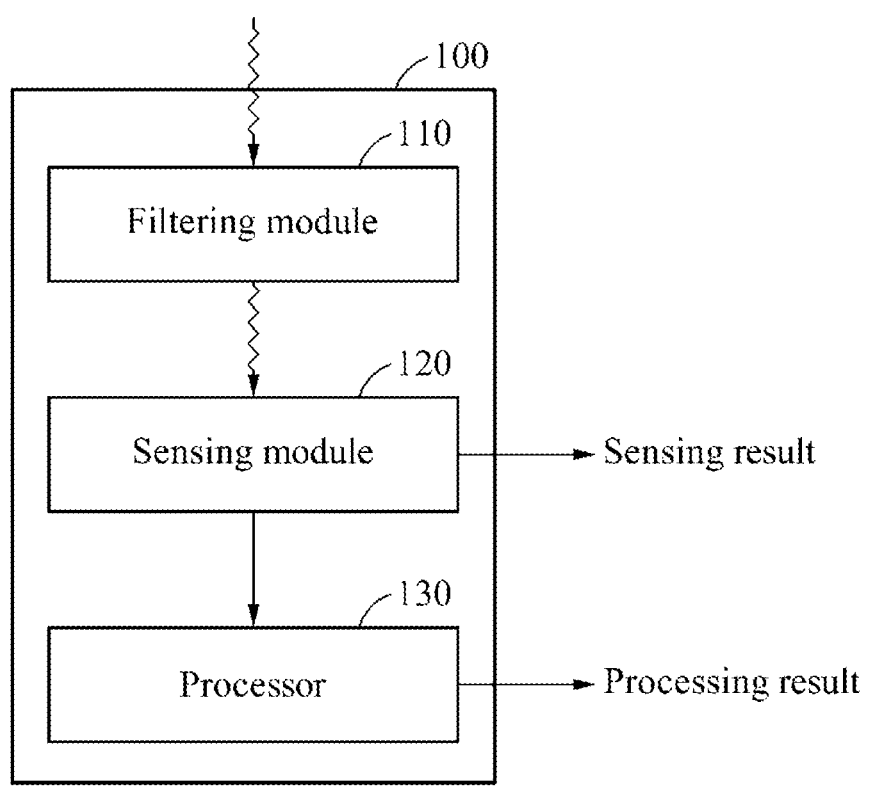
FIG. 1 is a block diagram illustrating a sensor, according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures. The exemplary embodiments may be used for a sensor for motion recognition, proximity recognition, and/or illumination recognition. Exemplary embodiments may be applied to various types of products, for example, personal computers, laptop computers, tablet computers, smart phones, televisions, smart home appliances, intelligent vehicles, kiosks, and wearable devices.

FIG. 1 is a block diagram illustrating a sensor 100, according to an exemplary embodiment.

Referring to FIG. 1, the sensor 100 includes a filtering module 110, a sensing module 120, and a processor 130. The filtering module 110 includes a plurality of filters. The plurality of filters may be configured to filter light incident to the sensing module 120.

The plurality of filters may be configured to filter light of different frequency bands. For example, the plurality of filters may include a color filter and an infrared (IR) filter. The color filter refers to a filter which selectively transmits light of a frequency band that corresponds to a visible ray of a predetermined color, and blocks light of other frequency bands. The color filter may include, for example, any of a red color filter, a green color filter, and a blue color filter. The IR filter refers to a filter which selectively transmits light of a frequency band that corresponds to an IR ray, and blocks light of other frequency bands.

The sensing module 120 includes a plurality of sensing elements and/or sensing devices. Each of the plurality of sensing elements may be configured to sense a respective change in light. The sensing module 120 may be configured to output a sensing result by using a sensing element which senses a change in light. For example, the sensing module 120 may output an event signal that corresponds to a sensing element which senses a change in light. The sensing result output by the sensing module 120 may be used to generate motion information. The motion information refers to information to be used for motion recognition. An operation of the sensing module 120 will be described in detail below.

The processor 130 may be configured to process information associated with an intensity of light that propagates through a predetermined filter. For example, the processor 130 may process information associated with an intensity of light that propagates through a particular one of the plurality of filters by using sensing elements that correspond to the particular filter. The processor 130 may process information associated with an intensity of light that propagates through each of the plurality of filters. The processor 130 may output a processing result. The processing result output by the processor 130 may be used to generate illumination information and/or proximity information. The illumination information refers to information to be used for illumination recognition, and the proximity information refers to information to be used for proximity recognition. An operation of the processor 130 will be described in detail below.

The sensor 100 may output information to be used to generate motion information, illumination information, proximity information, and/or various combinations thereof. The sensor 100 may be configured by using a single chip, and exemplary embodiments may provide a single-chip solution which outputs information to be used to generate motion information, illumination information, proximity information, and/or various combinations thereof.

Figure 2:
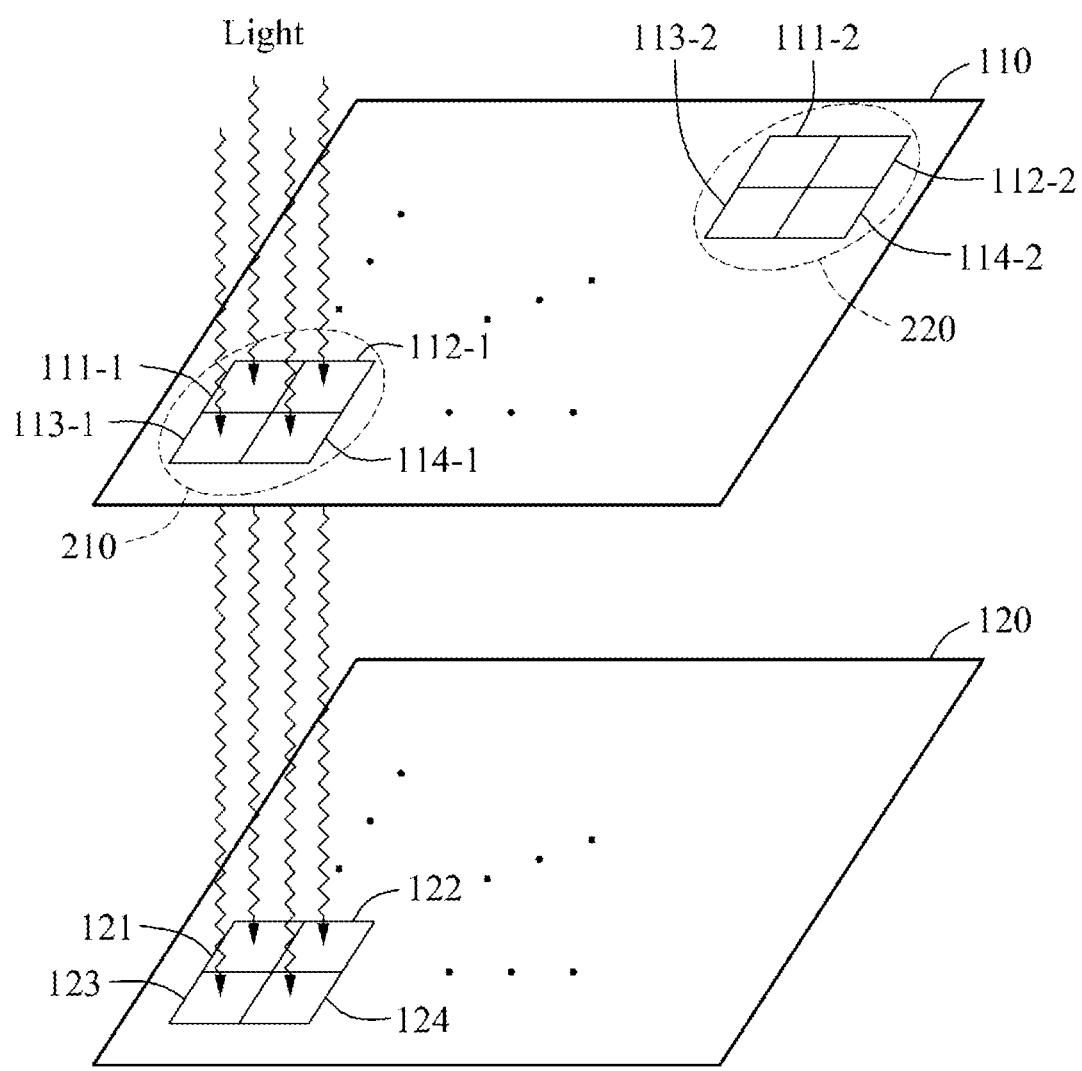
FIGS. 2, 3, and 4 are diagrams illustrating a matching relationship between a plurality of filters and a plurality of sensing elements, according to an exemplary embodiment.
Figure 3:
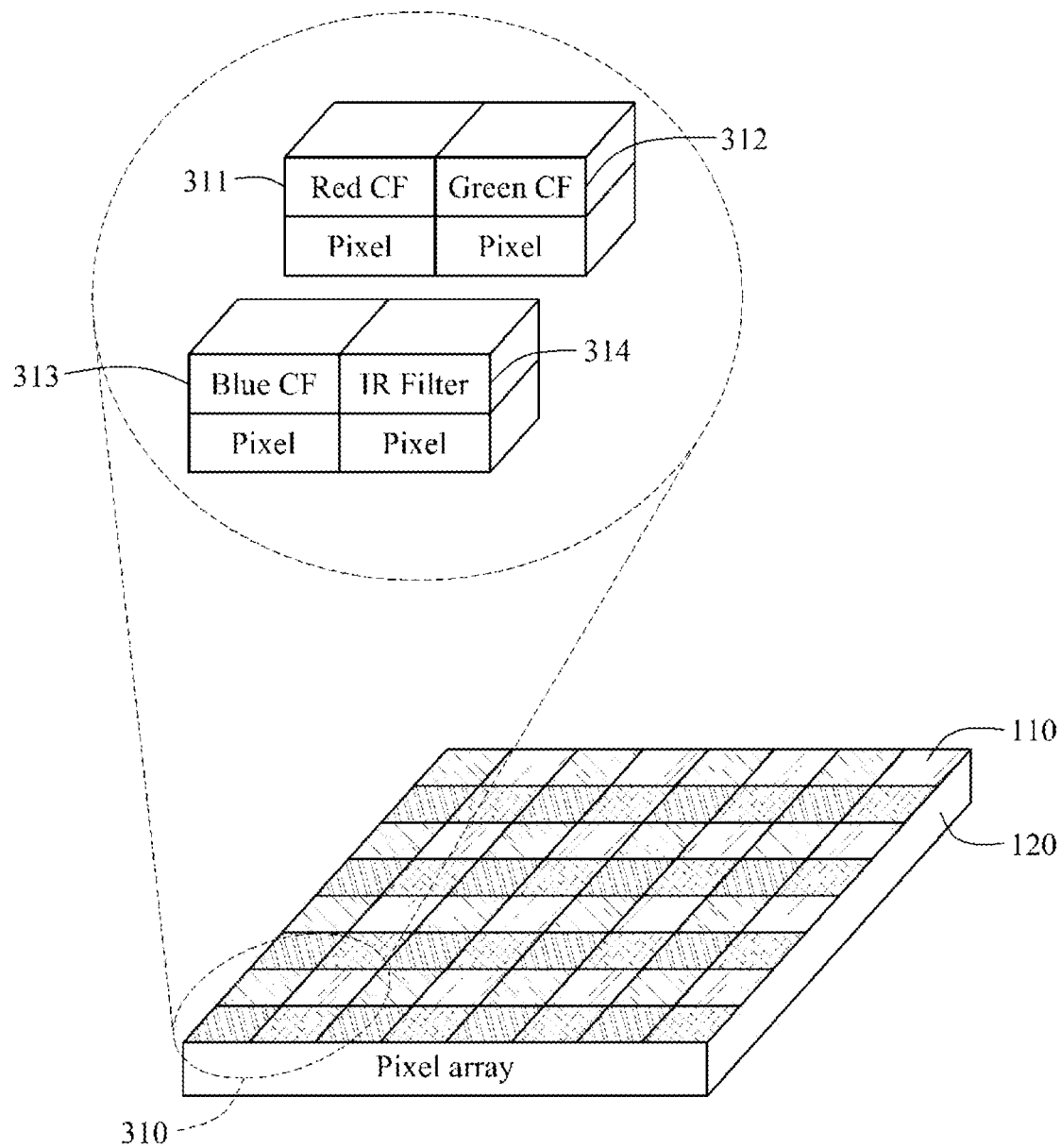
Figure 4:
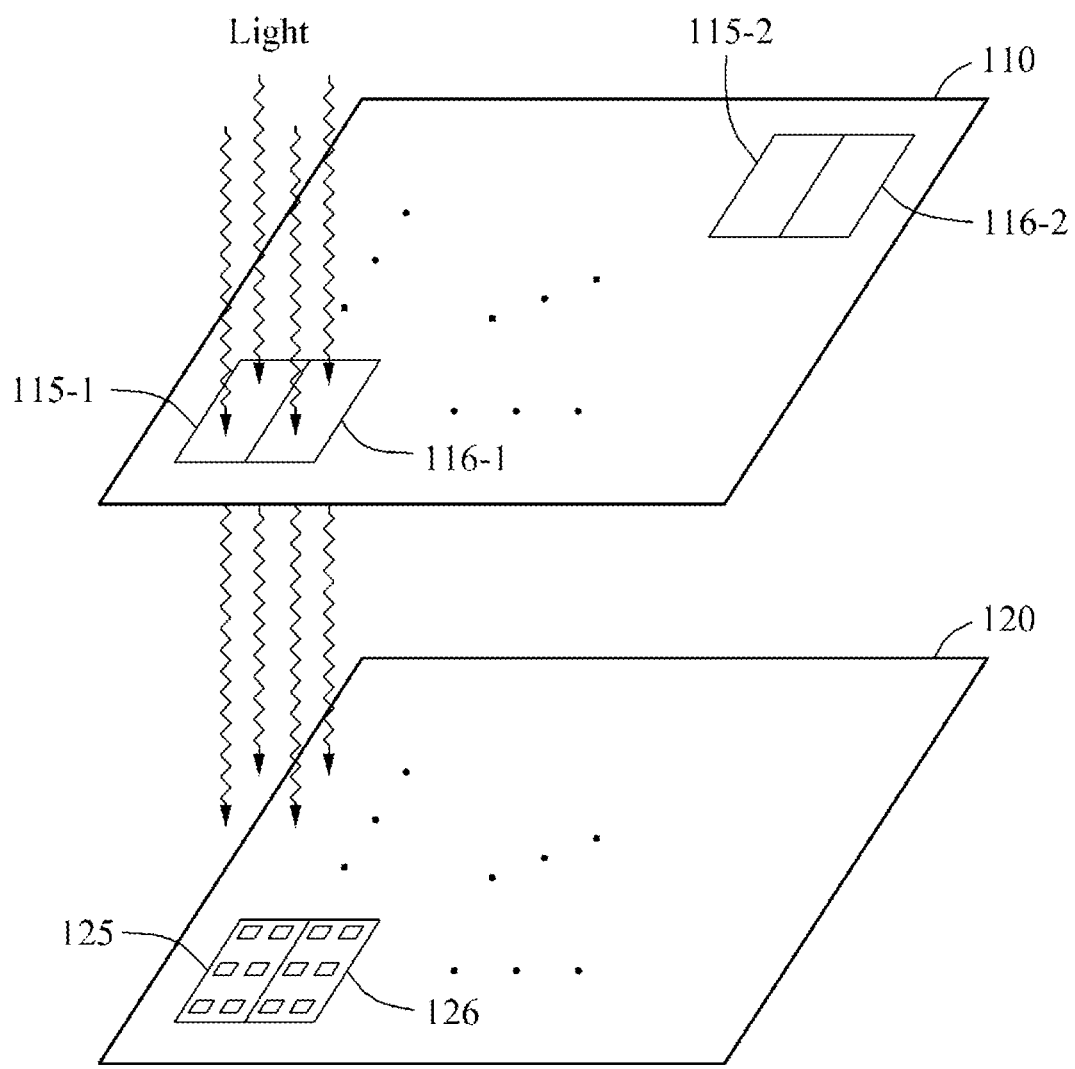

FIGS. 2, 3 and 4 are diagrams illustrating a matching relationship between a plurality of filters and a plurality of sensing elements, according to an exemplary embodiment.

Referring to FIG. 2, the filtering module 110 includes a plurality of filters. The filtering module 110 may include a filter layer. The plurality of filters may be disposed in a predetermined pattern. For example, the filtering module 110 may include a plurality of blocks, for example, a first block 210 and a second block 220, iteratively disposed in a form of a grid. The first block 210 may include a portion 111-1 of a first filter, a portion 112-1 of a second filter, a portion 113-1 of a third filter, and a portion 114-1 of a fourth filter. The second block 220 may include a portion 111-2 of the first filter, a portion 112-2 of the second filter, a portion 113-2 of the third filter, and a portion 114-2 of the fourth filter. The first filter including the portions 111-1 and 111-2 may be a first color filter, the second filter including the portions 112-1 and 112-2 may be a second color filter, the third filter including portions 113-1 and 113-2 may be a third color filter, and the fourth filter including the portions 114-1 and 114-2 may be an IR filter.

Hereinafter, a minimum unit of a filter may be referred to as a filter element. For example, a portion of each filter included in an individual block may be a filter element of the corresponding filter. In this example, the filter elements 111-1 and 111-2 of the first filter, the filter elements 112-1 and 112-2 of the second filter, the filter elements 113-1 and 113-2 of the third filter, and the filter elements 114-1 and 114-2 of the fourth filter may be uniformly distributed throughout the filtering module 110. The filter elements may be provided in a same size and a same shape. The plurality of filters may be equally distributed and/or uniformly distributed. For example, the filters may occupy areas of the same size within the filtering module 110.

The predetermined pattern may be modified in any of various ways. For example, the plurality of filters may be unequally distributed and/or nonuniformly distributed. For example, the filters may occupy areas of different sizes within the filtering module 110. The filter elements may be disposed not to be bound in block units. The filter elements may be disposed in any of various forms, such as, for example, a form of a stripe, a form of a diagonal line, and a form of a vortex. The filter elements may be provided in different sizes and/or different shapes.

The plurality of filters may filter light incident to the sensing module 120 based on the predetermined pattern. For example, each of the filter element 111-1 of the first filter, the filter element 112-1 of the second filter, the filter element 113-1 of the third filter, and the filter element 114-1 of the fourth filter may filter respective light incident to a first area 121, a second area 122, a third area 123, and a fourth area 124 in the sensing module 120, respectively. A sensing element belonging to an area to be filtered by a filter element of a predetermined filter may be matched to the corresponding filter. For example, a sensing element belonging to the first area 121 may be matched to the first filter, and sensing elements belonging to the second area 122, the third area 123, and the fourth area 124 may be matched to the second filter, the third filter, and the fourth filter, respectively.

The plurality of filters in the filtering module 110 may filter light in pixel units. Referring to FIG. 3, sensing elements in the sensing module 120 may constitute a pixel array. For example, the sensing elements may constitute a 128×128 pixel array. The pixel array may be referred to as a photo array, and the sensing elements constituting the pixel array may be referred to as pixels or cells.

Filter elements of each filter in the filtering module 110 may be matched to pixels constituting a pixel array, respectively. A size of an area in which light is to be filtered by each filter element may correspond to a size of a pixel to be matched. A size of a filter element may correspond to a size of a pixel to be matched.

The filter elements of the filtering module 110 may be disposed on the matched pixels of the sensing module 120. For example, referring to a block 310 including four filter elements and four pixels, a red color filter 311, a green color filter 312, a blue color filter 313, and an IR filter 314 may be disposed on pixels matched thereto, respectively. The remaining blocks, except the block 310, may also have the same structure.

The filter elements in the filtering module 110 may correspond to the plurality of sensing elements. Referring to FIG. 4, a filter element 115-1 of a fifth filter may filter light incident to a fifth area 125 of the sensor module 120, and a filter element 116-1 of a sixth filter may filter light incident to a sixth area 126 of the sensor module 120. Each of the fifth area 125 and the sixth area 126 may include a respective plurality of sensing elements. In this example, the sensing elements in the fifth area 125 may be matched to the fifth filter, and the sensing elements in the sixth area 126 may be matched to the sixth filter.

Figure 5:
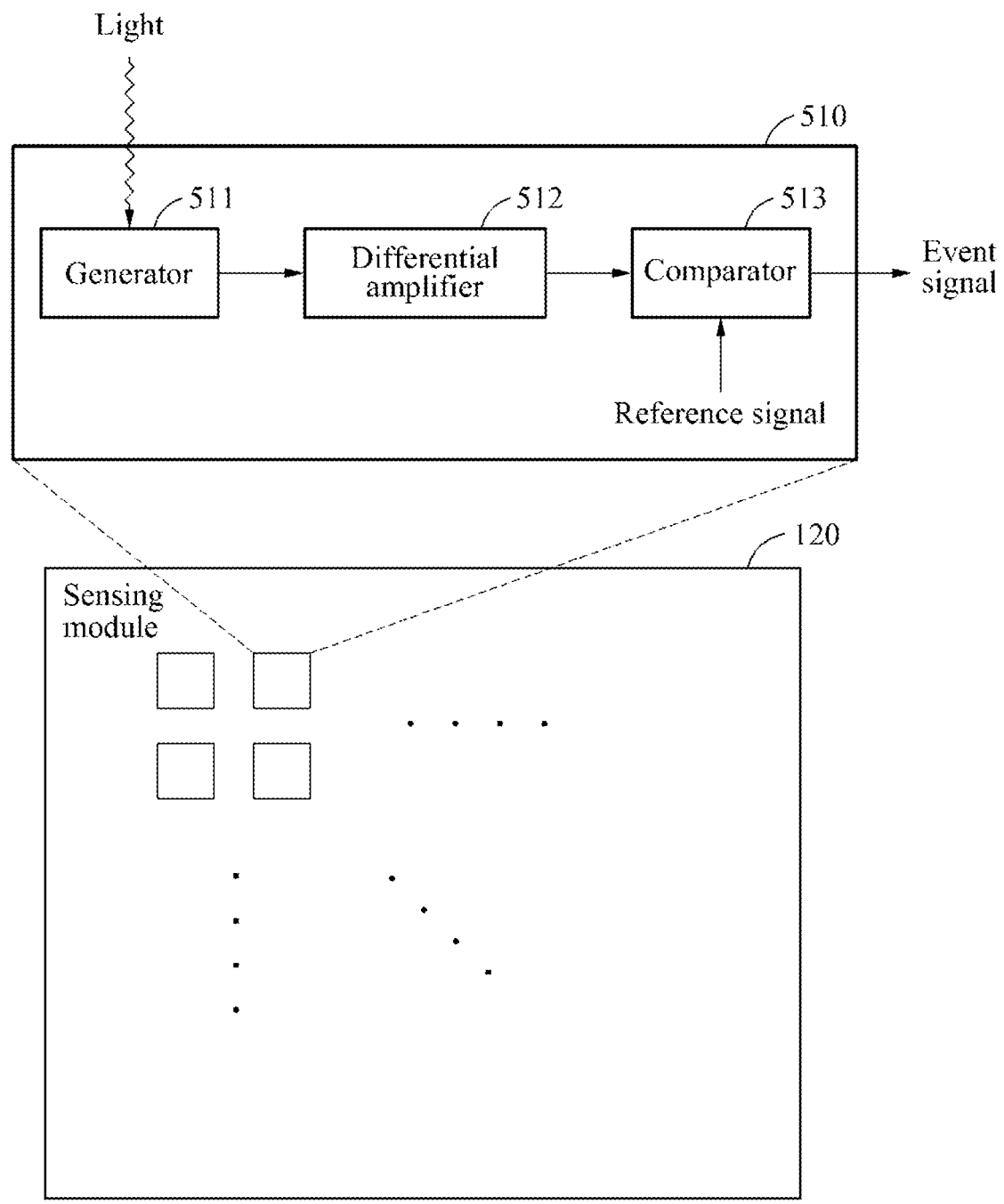
FIGS. 5 and 6 are diagrams illustrating an operation of a sensing module, according to an exemplary embodiment.
Figure 6:
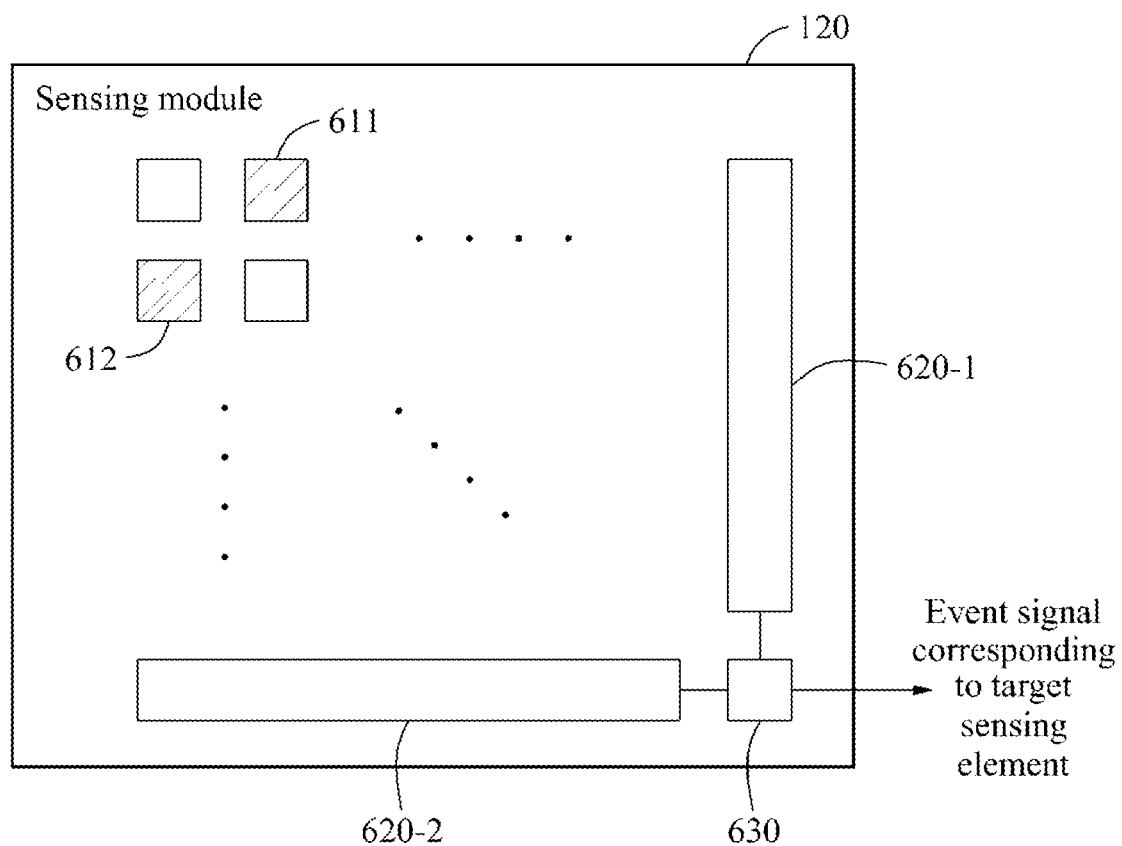

FIGS. 5 and 6 are diagrams illustrating an operation of the sensing module 120, according to an exemplary embodiment.

Referring to FIG. 5, the sensing module 120 includes a plurality of sensing elements 510. Each sensing element may sense a change in respective light that has propagated through a matched filter. For example, a sensing element 510 in the sensing module 120 may include a generator 511, a differential amplifier 512, and a comparator 513. The generator 511 may receive light incident thereto which has propagated through the filtering module 110. The generator 511 may receive light passing through a filter that is matched to the sensing element 510.

The generator 511 may generate a sensor signal in response to the incident light. For example, the generator 511 may sense an intensity of the incident light. The generator 511 may generate a sensor signal that is proportional to the intensity of the incident light. The sensor signal may include a current in an amount that is proportional to the intensity of the incident light. The generator 511 may include a photo diode.

The differential amplifier 512 may amplify a difference between a previously generated sensor signal and a currently generated sensor signal. For example, the differential amplifier 512 may amplify a difference between a voltage corresponding to an amount of a previously generated current and a voltage corresponding to an amount of a currently generated current. The differential amplifier 512 may use a logarithmic amplifier to generate a difference signal that is linearly proportional to a difference between an intensity of previous incident light and an intensity of current incident light.

The comparator 513 may compare the generated difference signal to a reference signal. The comparator 513 may compare the difference signal to the reference signal in order to verify whether a variance in an intensity of incident light is greater than or equal to a predetermined threshold. The comparator 513 may output an event signal in response to a determination that the variance in the intensity of the incident light is greater than or equal to the threshold. For example, when an increase in the intensity of the incident light is greater than or equal to the threshold, the comparator 513 may output an ON event signal. Conversely, when a decrease in the intensity of the incident light is greater than or equal to the predetermined threshold, the comparator 513 may output an OFF event signal. Hereinafter, an event signal output by a sensing element may be referred to as an internal event signal.

Referring to FIG. 6, only sensing elements which sense a change in an intensity of incident light, from among the plurality of sensing elements in the sensing module 120, may be configured to output internal event signals. For example, a sensing element 611 and a sensing element 612 may sense a change in an intensity of light, and other sensing elements may not sense a change in an intensity of light. In this example, the sensing element 611 and the sensing element 612 may output internal event signals, and the other sensing elements may not output internal event signals. Hereinafter, a sensing element which senses a change in an intensity of incident light may be referred to as a target sensing element. When a subject or an object to be photographed by the sensor 100 moves, light incident to the sensing module 120 may change, and thus, in this example, a target sensing element may be a sensing element which senses the movement of the subject or the object.

The sensing module 120 may further include a first arbiter 620-1, a second arbiter 620-2, and a communicator 630. Each of the first arbiter 620-1 and the second arbiter 620-2 may obtain information to be used to identify a target sensing element. A target sensing element may be identified based on an address in the sensing module 120. In this example, the first arbiter 620-1 may obtain an x-axial address of a target sensing element, and the second arbiter 620-2 may obtain a y-axial address of the target sensing element. A method of identifying a target sensing element may be modified in any of various ways. For example, a target sensing element may be identified via a unique index. In this example, each of the first arbiter 620-1 and the second arbiter 620-2 may obtain corresponding information.

The communicator 630 may output an event signal corresponding to a target sensing element to an outside of the sensor 100 (i.e., to a receiver which is external to the sensor 100). For example, when an internal event signal is output by the target sensing element 611, the communicator 630 may output an event signal that includes information which is usable for identifying the target sensing element 611 to the outside of the sensor 100. The communicator 630 may sequentially output a plurality of event signals that correspond to a plurality of respective target sensing elements. The communicator 630 may output a single event signal corresponding to the plurality of target sensing elements.

Hereinafter, an event signal output by the communicator 630 to the outside of the sensor 100 may be referred to as an external event signal. The external event signal may correspond to the sensing result of FIG. 1. The external event signal may be used to generate motion information. Generation of motion information will be described in detail below.

The sensing module 120 may be an event-based vision sensor which is configured to output an event signal time-asynchronously in response to sensing a predetermined event. Unlike a frame-based vision sensor, the event-based vision sensor may output only an event signal of a pixel in which a change in light is sensed, rather than scanning an output of a photo diode of each pixel in frame units.

FIGS. 7, 8, 9, and 10 are diagrams illustrating an operation of the processor 130, according to an exemplary embodiment.

Figure 7:
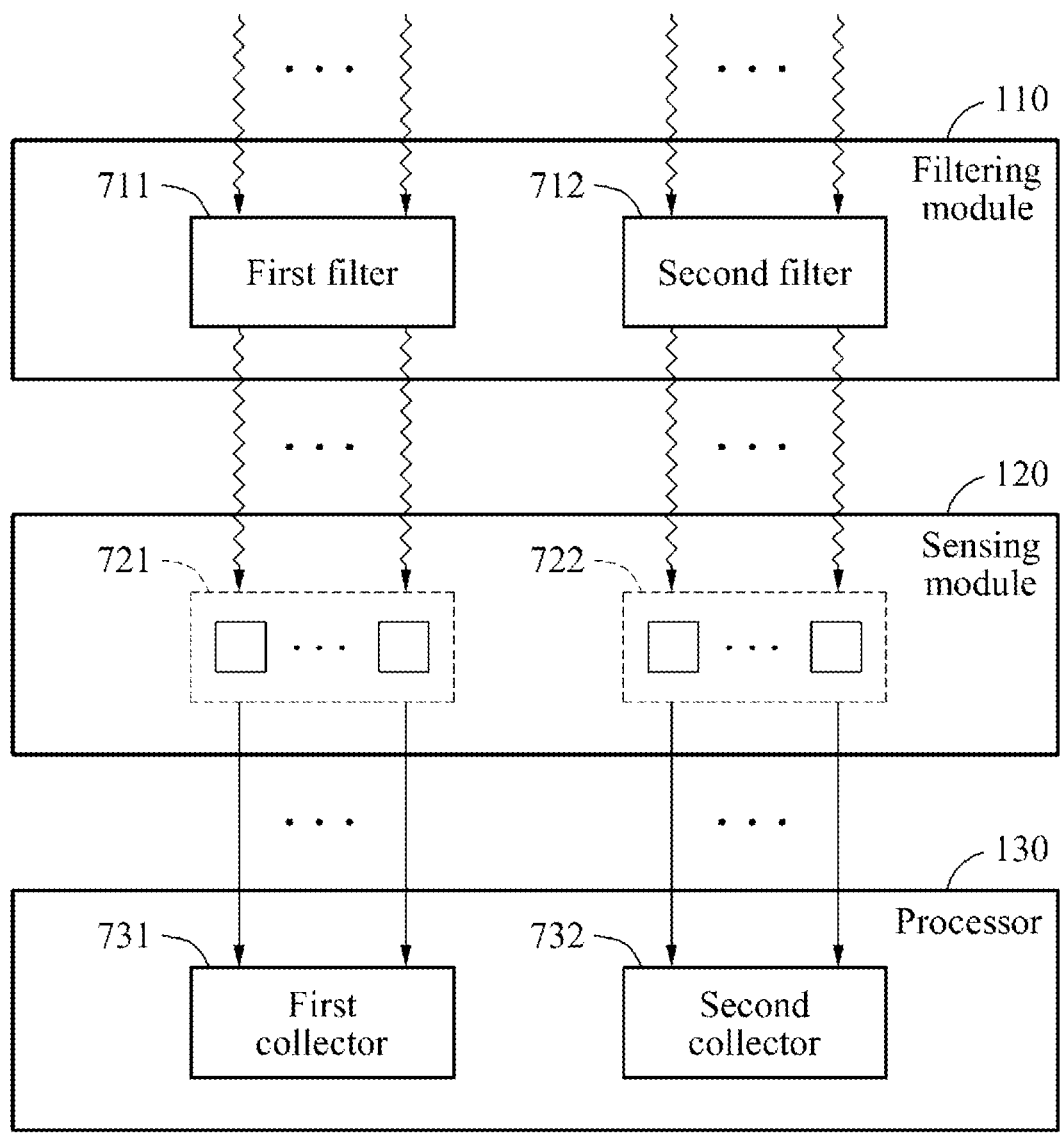
FIGS. 7, 8, 9, and 10 are diagrams illustrating an operation of a processor, according to an exemplary embodiment.

Referring to FIG. 7, the processor 130 may collect information from sensing elements that correspond to each respective filter. For example, the filtering module 110 may include a first filter 711 and a second filter 712. In this example, sensing elements corresponding to the first filter 711 may be sensing elements 721 matched to the first filter 711, from among sensing elements included in the sensing module 120. Sensing elements corresponding to the second filter 712 may be sensing elements 722 matched to the second filter 712, from among the sensing elements included in the sensing module 120.

The processor 130 may include a first collector 731 and a second collector 732. The first collector 731 may collect information from the sensing elements 721 corresponding to the first filter 711, and the second collector 732 may correct information from the sensing elements 722 corresponding to the second filter 712.

For ease of description, a case in which the filtering module 110 includes two filters and the processor 130 includes two collectors is described. However, exemplary embodiments may extend to a case in which the filtering module 110 includes at least three filters and the processor 130 includes at least three collectors.

Figure 8:
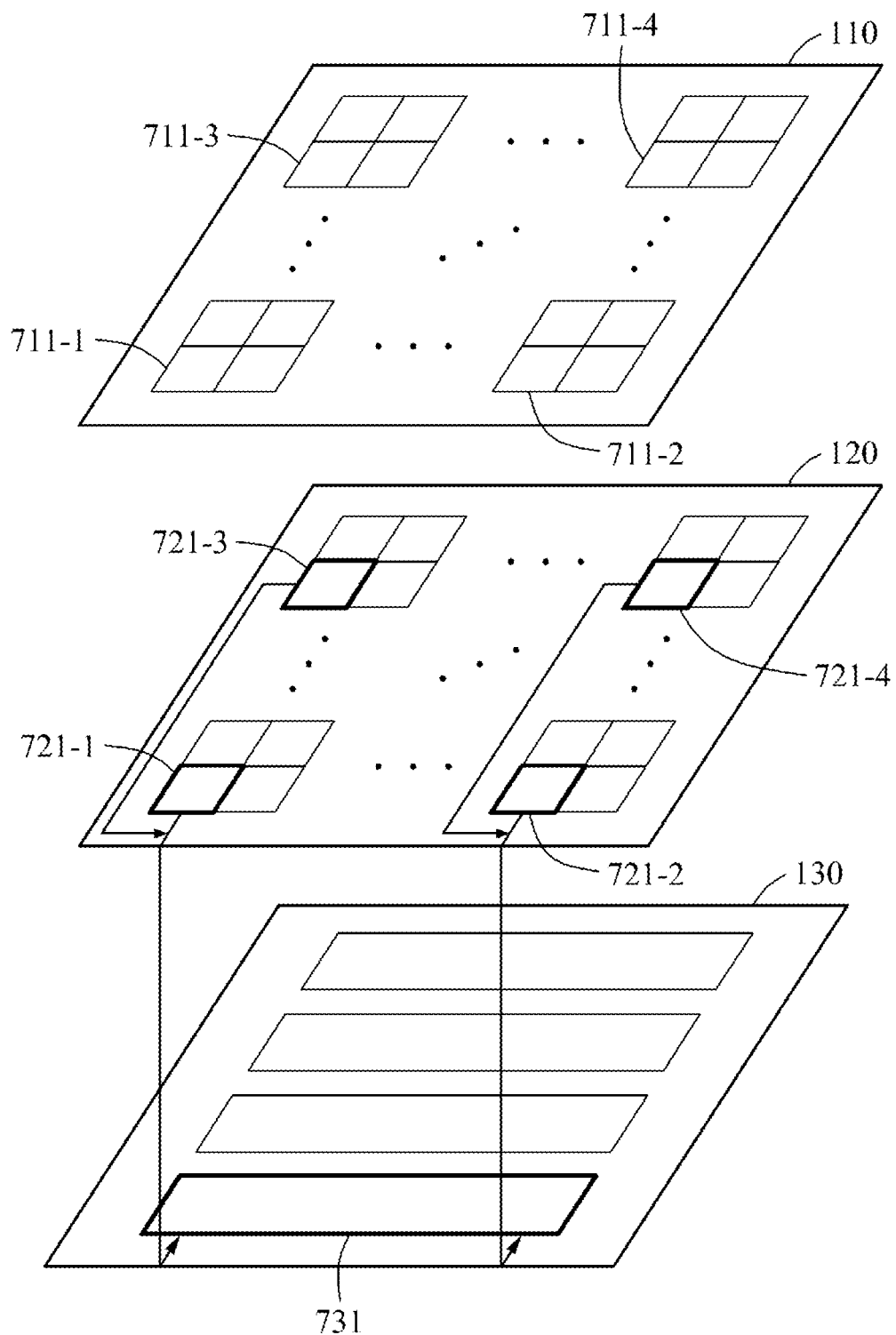

Referring to FIG. 8, the plurality of filters in the filtering module 110 may be disposed in a predetermined pattern. Filter elements of each filter may be disposed at different positions based on the predetermined pattern. For example, filter elements 711-1, 711-2, 711-3, and 711-4 of the first filter 711 may be disposed at different positions to be uniformly distributed within the filtering module 110. In this example, sensing elements 721-1, 721-2, 721-3, and 721-4 disposed in areas in which light is filtered by the filter elements 711-1, 711-2, 711-3, and 711-4 of the first filter 711 may be matched to the first filter 711.

The first collector 731 may be electrically connected to the sensing elements 721-1, 721-2, 721-3, and 721-4 corresponding to the first filter 711 based on a pattern in which the filter elements 711-1, 711-2, 711-3, and 711-4 of the first filter 711 are disposed. The first collector 731 may collect information from the sensing elements 721-1, 721-2, 721-3, and 721-4 corresponding to the first filter 711. Although not shown in FIG. 8, each of the remaining collectors, except the first collector 731, may also be electrically connected to corresponding sensing elements, and may be configured to collect information from the corresponding sensing elements.

Figure 9:
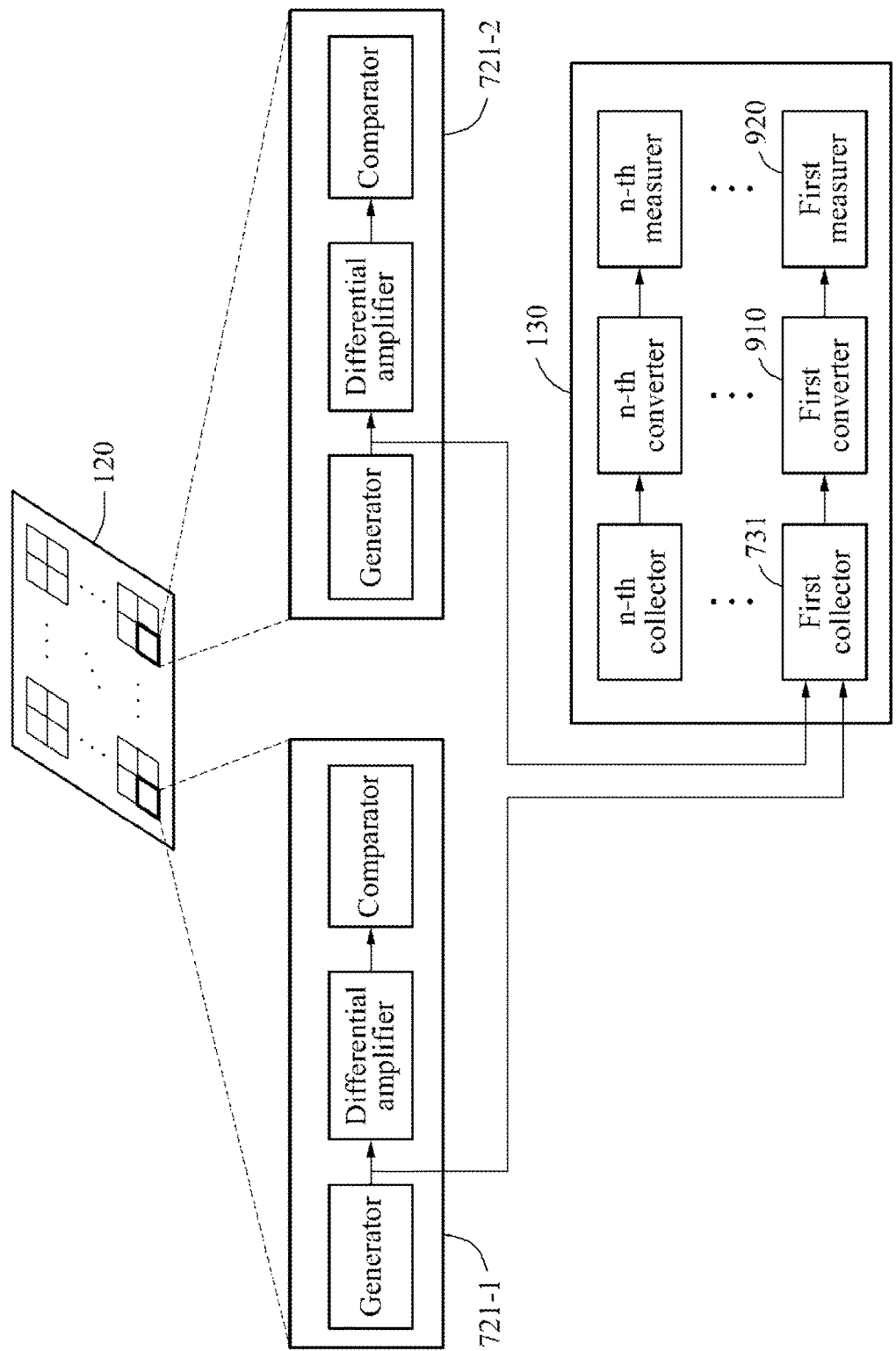

Referring to FIG. 9, information collected from each sensing element may include a sensor signal generated by the corresponding sensing element. Each sensing element may include a generator as described with reference to FIG. 5. The processor 130 may collect sensor signals generated by generators of sensing elements that correspond to each respective filter. A sensor signal generated by each sensing element may include a current in an amount that is proportional to an intensity of light sensed by the corresponding sensing element. In this example, the first collector 731 may collect currents generated by the sensing elements 721-1 and 721-2 corresponding to the first filter 711. For example, the first collector 731 may collect the currents using a circuit which mirrors the currents generated by the sensing elements 721-1 and 721-2. Although not shown in FIG. 9, each of the remaining collectors, except the first collector 731, may also collect respective sensor signals generated by corresponding sensing elements.

The processor 130 may further include a converter and a measurer to process collected information corresponding to each filter. For example, the processor 130 may further include a first converter 910 and a first measurer 920, each of which corresponds to the first collector 731. The first converter 910 may convert currents collected by the first collector 731 into a voltage. The first converter 910 may output a voltage that is linearly proportional to an amount of the currents collected by the first collector 731. The measurer 920 may measure the voltage output by the first converter 910. Although not shown in FIG. 9, information collected by the remaining collectors, except the first collector 731, may also be processed by using the foregoing method. The processor 130 may measure an amount of collected currents corresponding to each filter and thus, may be referred to as a measurement circuit.

The processor 130 may output the collected information corresponding to each filter. For example, the processor 130 may output a voltage indicating an amount of collected currents that correspond to a first filter by using the first collector 731, the first converter 910, and the first measurer 920. The amount of the collected current corresponding to the first filter may be a total amount of currents generated by sensing elements corresponding to the first filter. Collected information corresponding to each filter may correspond to the processing result of FIG. 1. The collected information corresponding to each filter may be used to generate illumination information and/or proximity information. Generation of illumination information and/or proximity information will be described in detail below.

Figure 10:
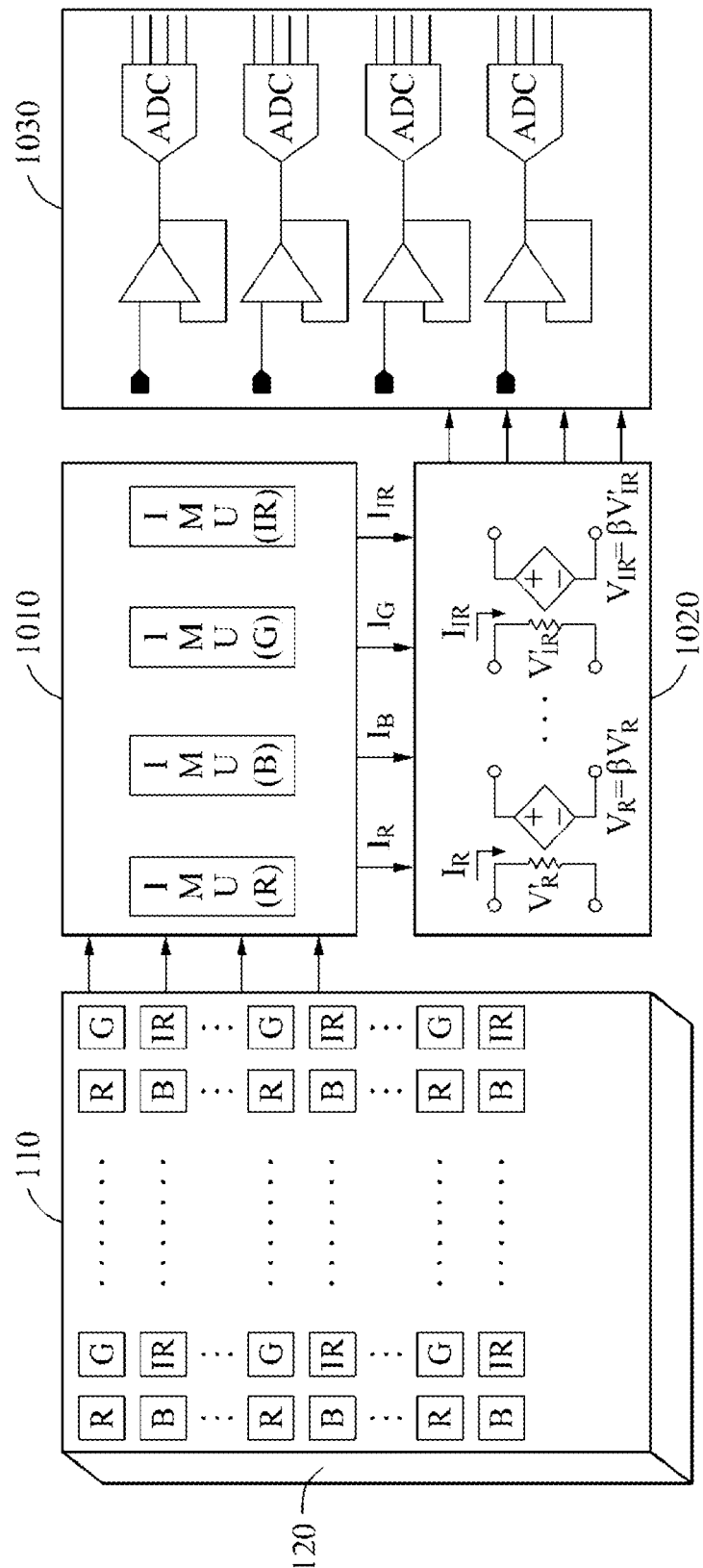

Referring to FIG. 10, the filtering module 110 may include a red color filter, a green color filter, a blue color filter, and an IR filter disposed in a predetermined pattern. The filtering module 110 may be disposed on the sensing module 120. A collector 1010 may collect currents of sensing elements corresponding to each respective filter. The collector 1010 may include an intensity measurement unit (IMU) corresponding to each respective filter.

The IMU may be a current mode light intensity measurement unit. For example, an IMU corresponding to each respective filter may output collected currents. IMU(R) denotes an IMU corresponding to a red color filter, IMU(B) denotes an IMU corresponding to a blue color filter, IMU(G) denotes an IMU corresponding to a green color filter, and IMU(IR) denotes an IMU corresponding to an IR filter. Further, $I_R$ denotes a current output by IMU(R), $I_B$ denotes a current output by IMU(B), $I_G$ denotes a current output by IMU(G), and $I_R$ denotes a current output by IMU(IR).

A converter 1020 may convert the collected currents corresponding to each respective filter into a corresponding voltage. For example, $V'_R$ denotes a voltage converted from $I_R$, and $V'_{IR}$ denotes a voltage converted from $I_R$. The converter 1020 may amplify the converted voltage so that the voltage may be measured by a measurer 1030. For example, $V_R$ denotes a voltage obtained by amplifying $V'_R$ by a factor of $\beta$, and $V_{IR}$ denotes a voltage obtained by amplifying $V'_{IR}$ by a factor of $\beta$. The converter 1020 may output a respective voltage that is linearly proportional to an amount of the collected currents corresponding to each respective filter. The converter 1020 may be configured using a linear current-to-voltage converter.

The measurer 1030 may measure a respective voltage output with respect to each respective filter. The measurer 1030 may include an analog-to-digital converter (ADC)

corresponding to each respective filter. The collector 1010, the converter 1020, and the measurer 1030 may be sub-circuits constituting the processor 130.

Figure 11:
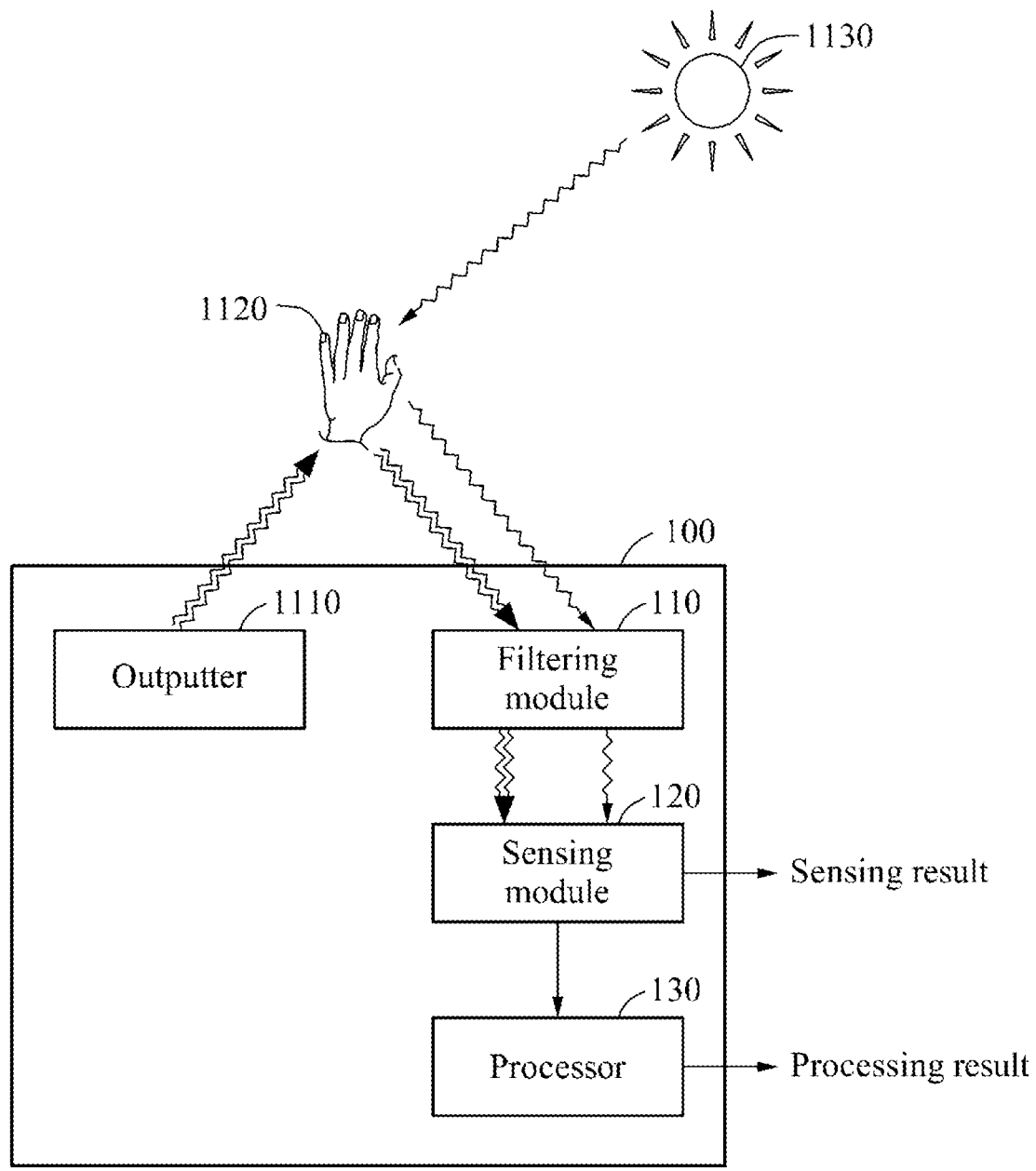
FIG. 11 is a diagram illustrating an outputter, according to an exemplary embodiment.

FIG. 11 is a diagram illustrating an outputter 1110, according to an exemplary embodiment.

Referring to FIG. 11, the sensor 100 may further include the outputter 1110. The outputter 1110 may output an IR ray in order to recognize an object proximate to the sensor 100. For example, the outputter 1110 may include an IR emitter.

The filtering module 110 may receive a visible ray emitted from a light source 1130 and reflected by an object 1120. The received visible ray may be filtered by a color filter of the filtering module 110. The filtering module 110 may receive an IR ray generated by the outputter 1110 and reflected by the object 1120. The received IR ray may be filtered by an IR filter of the filtering module 110.

Figure 12:
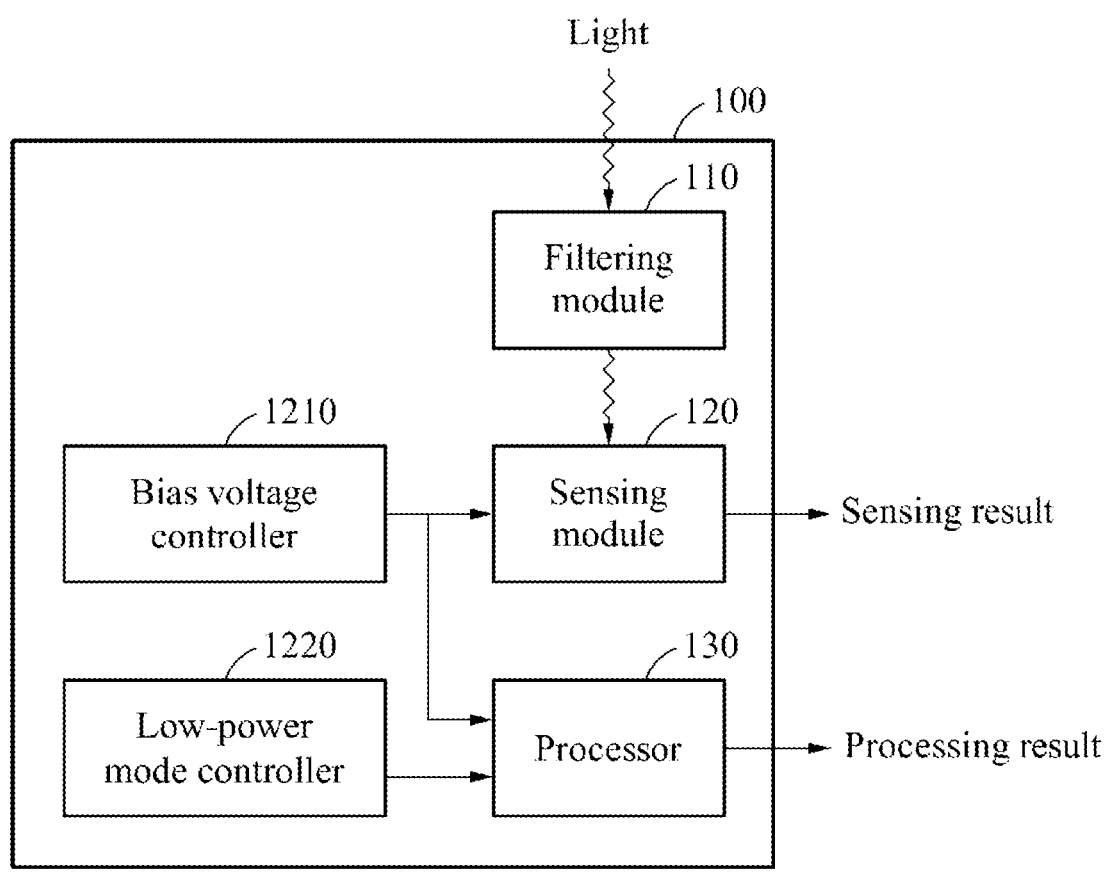
FIG. 12 is a block diagram illustrating a bias voltage controller and a low-power mode controller, according to exemplary embodiment.

FIG. 12 is a block diagram illustrating a bias voltage controller 1210 and a low-power mode controller 1220, according to exemplary embodiment.

Referring to FIG. 12, the sensor 100 may further include the bias voltage controller 1210. The bias voltage controller 1210 may control a bias voltage of the sensing module 120 and/or a bias voltage of the processor 130. The bias voltage controller 1210 may control the bias voltage of the sensing module 120 to adjust a sensitivity for sensing. The bias voltage controller 1210 may control the bias voltage of the processor 130 to adjust any one or more of a sensitivity for collection, a sensitivity for conversion, and a sensitivity for measurement. For example, the bias voltage controller 1210 may adjust the sensitivities to compensate for a loss occurring when light is filtered by the filtering module 110.

The bias voltage controller 1210 may control the bias voltage of the sensing module 120 to adjust a power consumption for sensing. The bias voltage controller 1210 may control the bias voltage of the processor 130 to adjust any one or more of a power consumption for collection, a power consumption for conversion, and a power consumption for measurement.

The sensor 100 may further include the low-power mode controller 1220. The low-power mode controller 1220 may control a low-power mode of the processor 130. For example, only a sensing result to be used to generate motion information may be required, and a processing result to be used to generate illumination information and proximity information may not be required. In this example, the low-power mode controller 1220 may control the processor 130 to operate in the low-power mode. The low-power mode controller 1220 may cut off power to be supplied to the processor 130. The low-power mode controller 1220 may switch a state of the processor 130 from an activation state to an idle state.

Figure 13A:
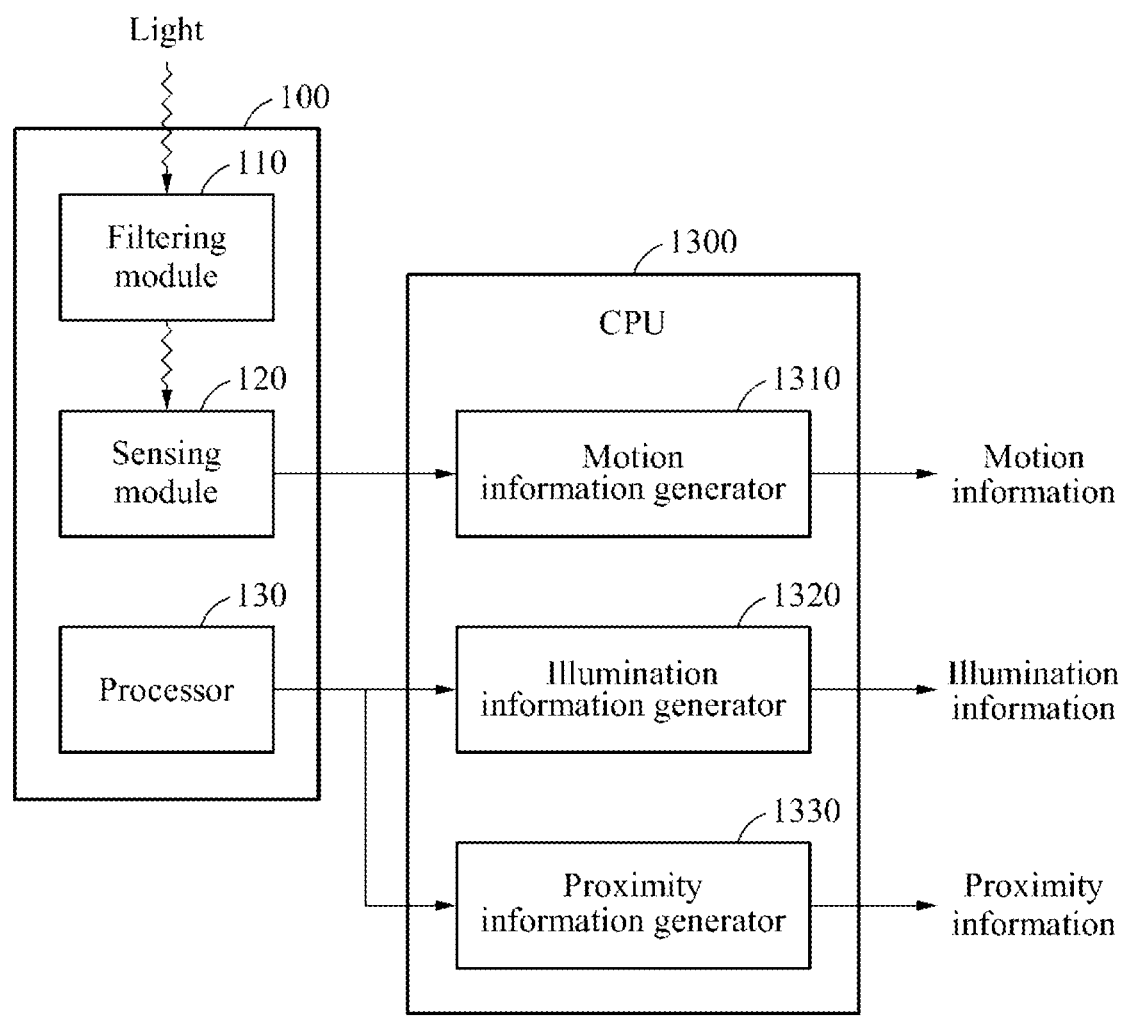
FIGS. 13A and 13B are diagrams illustrating a central processing unit (CPU), according to an exemplary embodiment.
Figure 13B:
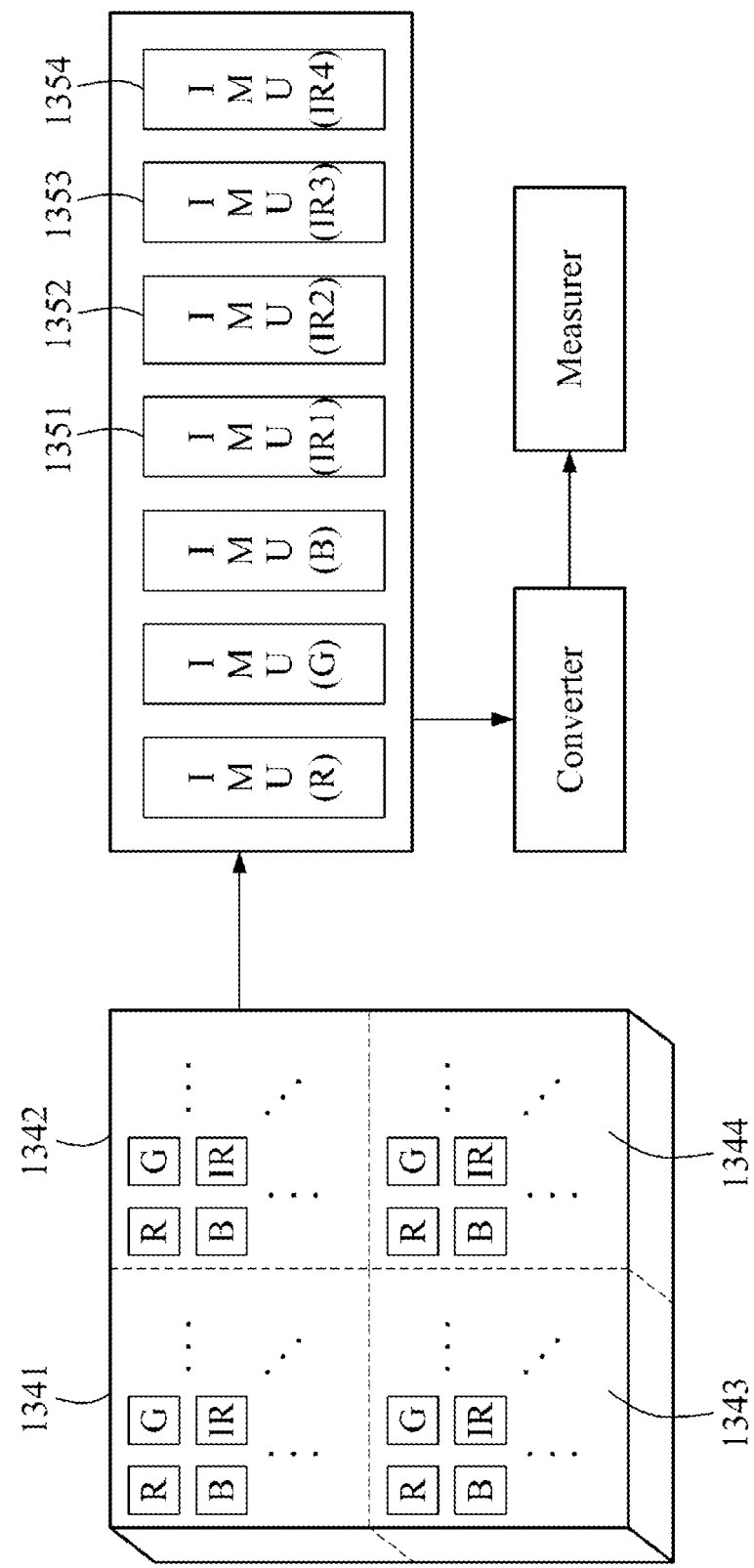

FIGS. 13A and 13B are diagrams illustrating a CPU 1300, according to an exemplary embodiment.

Referring to FIG. 13A, the CPU 1300 may generate motion information, illumination information, and proximity information based on signals output from the sensor 100. The CPU 1300 may include a motion information generator 1310, an illumination information generator 1320, and a proximity information generator 1330.

The motion information generator 1310 may be configured to receive an output of the sensing module 120, and to generate motion information based on the received output. The sensing module 120 may output an external event signal. The external event signal may include information to be used to identify a target sensing element which senses a movement of an object and/or a change in light. The external event signal may further include information relating to a time at which the movement of the object or the change in light is sensed.

The motion information generator 1310 may obtain information relating to a position at which the movement of the object or the change in light is sensed from the information to be used to identify the target sensing element. For example, the information to be used to identify the target sensing element may include (x-axial address, y-axial address). In this example, the motion information generator 1310 may be aware that the movement of the object or the change in light is sensed at a position corresponding to (x-axial address, y-axial address).

The motion information generator 1310 may manage an event map. The event map may include a two-dimensional (2D) matrix corresponding to a structure in which sensing elements of the sensing module 120 are disposed. The event map may include respective elements that correspond to the sensing elements of the sensing module 120, and each element may store information relating to a most recent time at which a movement of an object or a change in light is sensed by a corresponding sensing element. When an external event signal is received, the motion information generator 1310 may update a value of an element corresponding to the external event signal, from among the elements included in the 2D matrix, with time information included in the external event signal.

The motion information generator 1310 may generate motion information by using the event map. For example, the motion information generator 1310 may analyze the event map, and determine time information and/or space information that relates to event signals. The time information and the space information relating to the event signals may correspond to a temporal correlation and a spatial correlation between target sensing elements which sense a movement of an object and/or a change in light. The motion information generator 1310 may model the movement of the object or the change in light based on the spatial correlation and/or the temporal correlation between the target sensing elements. The motion information generator 1310 may recognize a motion based on the generated motion information.

For example, the movement of the object or the change in light may be modeled as an x-axial velocity component, a y-axial velocity component, a z-axial velocity component, and a rotation velocity component. The x-axial velocity component and the y-axial velocity component may be velocity components of two directions which are mutually orthogonal on a virtual plane which is parallel with the sensor 100. The z-axial velocity component may be a velocity component of a direction that extends from the virtual plane toward the sensor 100. The rotation velocity component may be a velocity component of a clockwise rotation on the virtual plane. The foregoing velocity components are merely exemplary, and a method of modeling a movement of an object or a change in light may be modified in any of various ways.

The motion information generator 1310 may generate motion information that corresponds to a plurality of filters. For example, the motion information generator 1310 may generate motion information for each color. The motion information generator 1310 may be aware of a filter to which a target sensing element that corresponds to the received external event signal is matched, based on information relating to a pattern in which the filters in the filtering module 110 are disposed, or information relating to a matching relationship between respective sensing elements in the sensing module and the corresponding filters. The motion information generator 1310 may recognize a motion input using red light based on event signals of target sensing elements that correspond to a red color filter.

The illumination information generator 1320 may be configured to receive an output of the processor 130, and to generate illumination information based on the received output. The processor 130 may output information collected from respective sensing elements that correspond to each respective filter. The information collected from the sensing elements corresponding to each filter may include information relating to an intensity of light that has propagated through the corresponding filter.

The illumination information generator 1320 may generate the illumination information based on information relating to an intensity of light that has propagated through a color filter. For example, the illumination information generator 1320 may calculate a level of illumination sensed by the sensor 100 based on information relating to an intensity of light that has propagated through a green color filter.

The illumination information generator 1320 may calculate the level of illumination by comparing an intensity of light that has propagated through a predetermined color filter to a predetermined threshold. The illumination information generator 1320 may calculate a final level of illumination based on respective intensities of light which correspond to a plurality of color filters.

Sensing elements that correspond to the predetermined color filter may be uniformly distributed in the sensing module 120. The illumination information generator 1320 may use information collected from the sensing elements uniformly distributed in the sensing module 120. Thus, the illumination information generator 1320 may generate accurate illumination information despite a sensing error that occurs in a subset of the sensing elements.

The proximity information generator 1330 may be configured to receive an output of the processor 130, and to generate proximity information based on the received output. The proximity information generator 1330 may generate the proximity information based on information relating to an intensity of light that has propagated through an IR filter. For example, the proximity information generator 1330 may verify whether an object is present within a proximity recognition area of the sensor 100 based on the information relating to the intensity of light that has propagated through the IR filter. The proximity recognition area of the sensor 100 refers to a 3D space in which proximity recognition is possible on a periphery of the sensor 100, and may be determined based on an intensity of an IR ray generated by the sensor 100. The proximity information generator 1330 may verify whether an object is present in the proximity recognition area by comparing the intensity of light that has propagated through the IR filter to a predetermined threshold.

Sensing elements corresponding to the IR filter may be uniformly distributed in the sensing module 120. The proximity information generator 1330 may use information collected from the sensing elements which are uniformly distributed in the sensing module 120. Thus, the proximity information generator 1330 may accurately verify whether an object is present in the proximity recognition area despite a sensing error that occurs in a subset of the sensing elements.

In an example, the proximity information generator 1330 may generate simple motion information. The sensing elements that correspond to the IR filter may be divided into a plurality of groups based on respective positions in the sensing module 120. For example, referring to FIG. 13B, the sensing elements that correspond to the IR filter may be divided into a plurality of groups 1341, 1342, 1343, and 1344. In this example, the processor 130 may output information that corresponds to each of the groups 1341, 1342, 1343, and 1344. The processor 130 may include respective collectors 1351, 1352, 1353, and 1354 which correspond to the respective groups 1341, 1342, 1343, and 1344. Although not shown in FIG. 13B, the processor 130 may further include respective converters and respective measurers which correspond to the respective groups 1341, 1342, 1343, and 1344.

The proximity information generator 1330 may generate the simple motion information based on information associated with an IR ray sensed by sensing elements of the first group 1341, hereinafter, first IR information, information associated with an IR ray sensed by sensing elements of the second group 1342, hereinafter, second IR information, information associated with an IR ray sensed by sensing elements of the third group 1343, hereinafter, third IR information, and information associated with an IR ray sensed by sensing elements of the fourth group 1344, hereinafter, fourth IR information. Each of the first IR information, the second IR information, the third IR information, and the fourth IR information may include information relating to an intensity of the respective IR ray sensed by the sensing elements of the corresponding group, and information relating to a time at which the respective IR ray is sensed by the sensing elements of the corresponding group.

For example, when an intensity of an IR ray indicated by the first IR information at a previous point in time is greater than a predetermined threshold, and an intensity of an IR ray indicated by the second IR information at a current point in time is greater than the predetermined threshold, the proximity information generator 1330 may determine that a motion moving from left to right is input.

Figure 14:
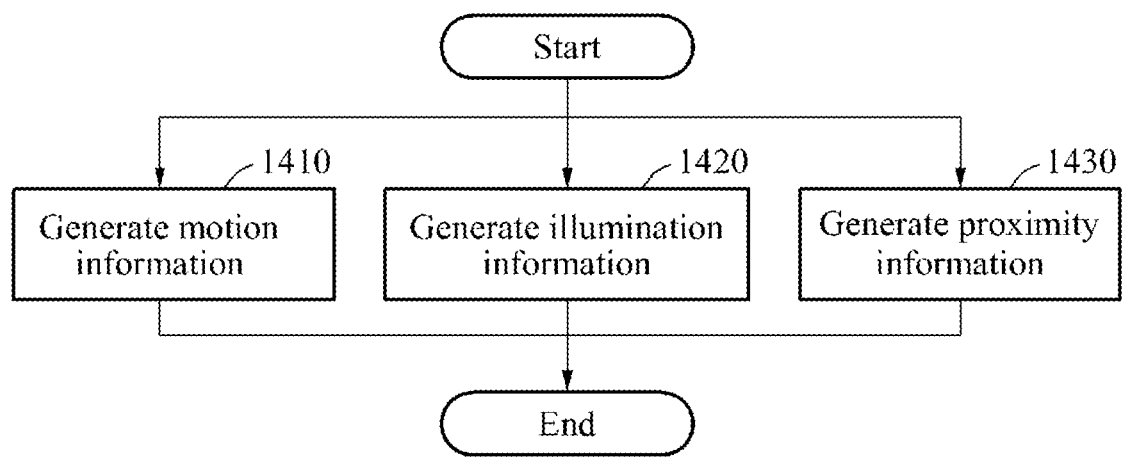
FIG. 14 is a flowchart illustrating an operating method of a CPU, according to an exemplary embodiment.

FIG. 14 is a flowchart illustrating an operating method of a CPU, according to an exemplary embodiment.

Referring to FIG. 14, the operating method of the CPU may include operation 1410 of generating motion information based on event signals generated by target sensing elements which sense a change in light, from among a plurality of sensing elements; operation 1420 of generating illumination information based on first sensor signals generated by first sensing elements which sense light that has propagated through a color filter, from among the plurality of sensing elements; and operation 1430 of generating proximity information based on second sensor signals generated by second sensing elements which sense light that has propagated through an IR filter, from among the plurality of sensing elements. The descriptions provided with reference to FIGS. 13A and 13B may be applicable to the operations of FIG. 14 and thus, duplicated descriptions will be omitted for conciseness.

Figure 15:
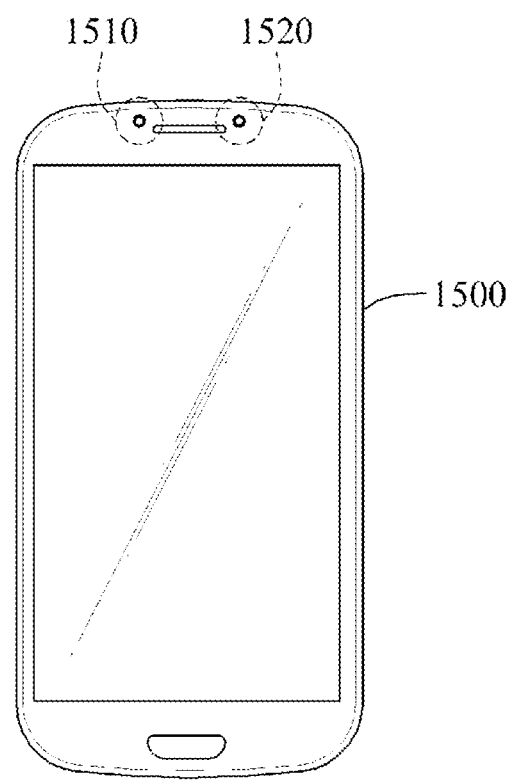
FIG. 15 illustrates a product including a sensor, according to an exemplary embodiment.

FIG. 15 illustrates a product including a sensor, according to an exemplary embodiment.

Referring to FIG. 15, a smart phone 1500 includes a general vision sensor 1510. The smart phone 1500 further includes a single sensor 1520 which is configured to output signals to be used for generating motion information, illumination information, and proximity information. The single sensor 1520 may correspond to the sensor 100 of FIG. 1.

The single sensor 1520 may be configured by using a single package which outputs signals to be used to generate motion information, illumination information, and/or proximity information. Thus, the single sensor 1520 may reduce a form factor of the smart phone 1500.

In an example, an event signal for motion information may be output only from a pixel in which a movement of an object and/or a change in light is sensed. Thus, the single sensor 1520 may operate using a relatively low power level. Further, a response time of each pixel may be measured in microseconds (µs) or smaller units (i.e., fractions of microseconds). Thus, the single sensor 1520 may operate with high performance.

A signal for illumination information and/or proximity information may include information obtained by collecting sensor signals generated by respective pixels. In this example, the sensor signals generated by the respective pixels may include currents which are measurable in femtoamperes (fA). Thus, the single sensor 1520 may operate using a relatively low power level. Further, each pixel may generate a sensor signal in response to a quantity of light which falls within a range of between a few lux to tens of lux. Thus, the single sensor 1520 may operate with high performance.

The units described herein may be implemented using hardware components, software components, or a combination thereof. For example, a processing device may be implemented using one or more general-purpose or special purpose computers, such as, for example, a processor, a controller, an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the exemplary embodiments described herein may be recorded on and/or store in non-transitory computer-readable media including program instructions to implement various operations embodied by a computer. The media may also include, alone or in combination with the program instructions, data files, data structures, and the like. The program instructions recorded on the media may be those specially designed and constructed for the purposes embodied herein, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image sensor comprising:
   a first group of filters configured to filter a visible light from an external light;
   a second group of filters configured to filter an infrared ray from the external light;
   a sensing module comprising a first group of sensing elements and a second group of sensing elements, wherein the sensing module is configured to receive a bias control signal, and the bias control signal is configured to adjust one or more of a power consumption for collection, a power consumption for conversion, or a power consumption of the sensing module;
   wherein the first group of sensing elements is configured to generate a first group of currents in response to the visible light filtered by the first group of filters, and output a first group of event signals based on the first group of currents;
   wherein the second group of sensing elements is configured to generate a second group of currents in response to the infrared ray filtered by the second group of filters, and output a second group of event signals based on the second group of currents;
   a first group of collectors configured to collect the first group of currents; and
   a second group of collectors configured to collect the second group of currents,
   wherein first information on the first group of currents collected by the first group of collectors is used to generate illumination information,
   wherein second information on the second group of currents collected by the second group of collectors is used to generate proximity information, and
   wherein the image sensor has a first mode and a second mode different from the first mode, and
   wherein the second mode consumes less power than the first mode.

2. The image sensor of claim 1, wherein the first group of filters, the second group of filters, the first group of sensing elements, and the second group of sensing elements are formed on a single chip.

3. The image sensor of claim 1, wherein the first group of filters is configured to receive the visible light from a first light source, and wherein the second group of filters is configured to receive the infrared ray from a second light source different from the first light source.

4. The image sensor of claim 1, wherein the first group of sensing elements includes a first number of pixels, and wherein the second group of sensing elements includes a second number of pixels smaller in number than the first number of pixels.

5. The image sensor of claim 1, wherein the first group of filters includes red color filters, green color filters, and blue color filters, and wherein the second group of filters includes infrared filters, and
wherein the red color filters, the green color filters, the blue color filters, and the infrared filters are arranged in a predetermined filter pattern.

6. The image sensor of claim 1, wherein each of the first group of sensing elements comprises:
a first generator configured to generate corresponding ones of the first group of currents in response to the visible light;
a first differential amplifier configured to amplify a difference between a first current which is previously generated by the first generator and a second current which is currently generated by the first generator; and
a first comparator configured to compare a difference output by the first differential amplifier with a first reference signal, and output corresponding ones of the first group of event signals based on a result of the comparison, and
wherein each of the second group of sensing elements comprises:
a second generator configured to generate corresponding ones of the second group of currents in response to the infrared ray;
a second differential amplifier configured to amplify a difference between a third current which is previously generated by the second generator and a fourth current which is currently generated by the second generator; and
a second comparator configured to compare the difference amplified by the second differential amplifier with a second reference signal, and output corresponding ones of the second group of event signals based on a result of the comparison.

7. The image sensor of claim 1, further comprising:
a first group of converters configured to convert the first group of currents collected by the first group of collectors into a first group of voltages;
a second group of converters configured to convert the second group of currents collected by the second group of collectors into a second group of voltages;
a first group of measurers configured to measure the first group of voltages to generate the first information; and
a second group of measurers configured to measure the second group of voltages to generate the second information.

8. The image sensor of claim 1, wherein each of the first group of event signals includes one of an ON event and an OFF event.

9. The image sensor of claim 8, further comprising:
a first arbiter configured to obtain a first x-address of each of the first group of sensing elements based on the first group of event signals and a second x-address for each of the second group of sensing elements based on the second group of event signals;
a second arbiter configured to obtain a first y-address of each of the first group of sensing elements based on the first group of event signals and a second y-address for each of the second group of sensing elements based on the second group of event signals; and
a communicator configured to output an external event signal based on the first x-address or the second x-address from the first arbiter and the first y-address or the second y-address from the second arbiter, wherein the communicator comprises a circuit configured to interface with a receiver external to the image sensor,
wherein the external event signal is used to generate motion information.

10. An image sensor comprising:
a sensing module comprising a first group of sensing elements and a second group of sensing elements, wherein the sensing module is configured to receive a bias control signal, and the bias control signal is configured to adjust one or more of a power consumption for collection, a power consumption for conversion, or a power consumption of the sensing module;
wherein the first group of sensing elements is configured to generate a first group of currents in response to a visible light, wherein an external light includes the visible light, and output a first group of event signals based on the first group of currents;
wherein the second group of sensing elements is configured to generate a second group of currents in response to an infrared ray, wherein the external light includes the infrared ray, and output a second group of event signals based on the second group of currents; and
a processor configured to generate first information based on the first group of currents and second information based on the second group of currents,
wherein the processor is further configured to operate according to one of a first mode and a second mode,
wherein the second mode consumes less power than the first mode.

11. The image sensor of claim 10, further comprising:
a first group of filters configured to filter the visible light from the external light; and
a second group of filters configured to filter the infrared ray from the external light.

12. The image sensor of claim 11, wherein the first group of filters includes red color filter, green color filters, and blue color filters, which are formed on a single chip,
the second group of filters includes infrared filters, which are formed on the single chip, and
the red color filter, the green color filters, the blue color filters, and the infrared filters are arranged in a predetermined color pattern.

13. The image sensor of claim 10, wherein the processor comprises:
a first group of collectors configured to collect the first group of currents;
a second group of collectors configured to collect the second group of currents;
a first group of converters configured to convert the first group of currents collected by the first group of collectors into a first group of voltages;
a second group of converters configured to convert the second group of currents collected by the second group of collectors into a second group of voltages;
a first group of measurers configured to measure the first group of voltages to generate the first information; and
a second group of measurers configured to measure the second group of voltages to generate the second information,
wherein the first information is used to generate illumination information by an external central processing unit (CPU), and the second information is used to generate proximity information by the external CPU.

14. The image sensor of claim 10, wherein each of the first group of sensing elements includes:
 a first generator configured to generate corresponding ones of the first group of currents in response to the visible light;
 a first differential amplifier configured to amplify a difference between first current which is previously generated by the first generator and second current which is currently generated by the first generator; and
 a first comparator configured to compare a difference output by the first differential amplifier with a first reference signal, and output corresponding ones of the first group of event signals based on a result of the comparison, wherein each of the second group of sensing elements includes:
 a second generator configured to generate corresponding ones of the second group of currents in response to the infrared ray;
 a second differential amplifier configured to amplify a difference between a third current which is previously generated by the second generator and a fourth current which is currently generated by the second generator; and
 a second comparator configured to compare the difference amplified by the second differential amplifier with a second reference signal, and output corresponding ones of the second group of event signals based on a result of the comparison.

15. An image sensor system comprising:
an image sensor configured to generate a plurality of currents in response to light incident from outside the image sensor system, and generate event signals based on a change of intensity of the light, and first information and second information based on the plurality of currents wherein the image sensor is configured to receive a bias control signal, and the bias control signal is configured to adjust one or more of a power consumption for collection, a power consumption for conversion, or a power consumption of the image sensor; and
a central processing unit (CPU) configured to generate motion information based on the event signals, illumination information based on the first information, and proximity information based on the second information, wherein the image sensor comprises:
 a first group of sensing elements configured to generate a first part of the plurality of currents in response to first light, wherein the light from outside includes the first light, and generate a first part of the event signals based on a change of intensity of the first light;
 a second group of sensing elements configured to generate a second part of the plurality of currents in response to second light, wherein the light from outside includes the second light, and generate a second part of the event signals based on a change of intensity of the second light; and
 a processor configured to generate the first information based on the first part of the plurality of currents, and the second information based on the second part of the plurality of currents, wherein the processor is further configured to operate according to one of a first mode and a second mode,
wherein the second mode consumes less power than the first mode.

16. The image sensor system of claim 15, wherein the processor comprises:
 a first group of collectors configured to collect the first part of the plurality of currents;
 a second group of collectors configured to collect the second part of the plurality of currents;
 a first group of converters configured to convert the first part of the plurality of currents collected by the first group of collectors into first voltages;
 a second group of converters configured to convert the second part of the plurality of currents collected by the second group of collectors into second voltages;
 a first group of measurers configured to measure the first voltages to generate the first information; and
 a second group of measurers configured to measure the second voltages to generate the second information.

17. The image sensor system of claim 15, wherein the first light is visible light.

18. The image sensor system of claim 15, wherein the second light is infrared light.

* * * * *